(12) United States Patent
Postelnik et al.

(10) Patent No.: US 11,962,665 B2
(45) Date of Patent: Apr. 16, 2024

(54) AUTOMATICALLY REDIRECTING MOBILE CLIENT DEVICES TO OPTIMIZED MOBILE CONTENT

(71) Applicant: CLOUDFLARE, INC., San Francisco, CA (US)

(72) Inventors: Igor Postelnik, Austin, TX (US); Mohd Fairuz Irtefa, Cedar Park, TX (US)

(73) Assignee: CLOUDFLARE, INC., San Francisco, CA (US)

( * ) Notice: Subject to any disclaimer, the term of this patent is extended or adjusted under 35 U.S.C. 154(b) by 174 days.

(21) Appl. No.: 16/391,109

(22) Filed: Apr. 22, 2019

(65) Prior Publication Data

US 2019/0379756 A1 Dec. 12, 2019

Related U.S. Application Data

(60) Provisional application No. 62/681,940, filed on Jun. 7, 2018.

(51) Int. Cl.
*H04L 67/563* (2022.01)
*H04L 67/04* (2022.01)
*H04L 67/01* (2022.01)

(52) U.S. Cl.
CPC ............ *H04L 67/563* (2022.05); *H04L 67/04* (2013.01); *H04L 67/01* (2022.05)

(58) Field of Classification Search
CPC ..... H04L 67/2814; H04L 67/04; H04L 67/42; H04L 67/303; H04L 67/2842
See application file for complete search history.

(56) References Cited

U.S. PATENT DOCUMENTS

| | | | | |
|---|---|---|---|---|
| 8,869,019 | B1* | 10/2014 | Sampath-Kumar | G06F 40/134 715/208 |
| 8,996,514 | B1* | 3/2015 | Gomes | G06F 16/24578 707/723 |
| 9,043,441 | B1* | 5/2015 | Cheng | G06F 3/0481 709/219 |
| 9,973,371 | B1* | 5/2018 | Upadhyay | H04L 29/08072 |
| 2002/0105539 | A1* | 8/2002 | Gamzon | H04L 67/75 709/204 |
| 2007/0100653 | A1* | 5/2007 | Ramer | G06Q 30/06 705/347 |
| 2008/0033998 | A1* | 2/2008 | Rao | G06F 16/951 |

(Continued)

*Primary Examiner* — William G Trost, IV
*Assistant Examiner* — Adam A Cooney
(74) *Attorney, Agent, or Firm* — NICHOLSON DE VOS WEBSTER & ELLIOTT LLP

(57) ABSTRACT

A server receives a request for a document from a client device. The server determines from the request that the client device is a mobile client device. The server determines that the requested document is not for an optimized mobile version and that there is an optimized mobile version of the document that is located at a different location. Instead of transmitting the requested document to the client device, the server transmits a redirect message to the client device to the optimized mobile version of the document. The server receives a request for the optimized mobile version of the document, retrieves that version of the document, and transmits that version of the document to the mobile client device.

15 Claims, 4 Drawing Sheets

(56) References Cited

U.S. PATENT DOCUMENTS

| | | | |
|---|---|---|---|
| 2008/0072138 A1* | 3/2008 | Cragun | G06F 16/93 715/239 |
| 2008/0072139 A1* | 3/2008 | Salinas | G06F 16/9577 715/764 |
| 2010/0146585 A1* | 6/2010 | Li | H04L 67/306 726/1 |
| 2010/0199197 A1* | 8/2010 | Faletski | G06F 16/9577 715/810 |
| 2011/0099294 A1* | 4/2011 | Kapur | H04L 67/02 709/246 |
| 2012/0191543 A1* | 7/2012 | Dharmaji | G06Q 30/0261 705/14.58 |
| 2013/0014128 A1* | 1/2013 | Suryanarayana | H04L 67/565 719/315 |
| 2013/0174012 A1* | 7/2013 | Kwan | G06F 16/958 715/234 |
| 2013/0268843 A1* | 10/2013 | Xu | H04L 67/02 715/234 |
| 2013/0326333 A1* | 12/2013 | Hashmi | G06F 16/958 715/234 |
| 2014/0052838 A1* | 2/2014 | Giacomoni | H04L 41/0893 709/223 |
| 2014/0095583 A1* | 4/2014 | Houle | G06F 16/9577 709/203 |
| 2014/0101282 A1* | 4/2014 | Lee | G06F 16/9577 709/217 |
| 2014/0164909 A1* | 6/2014 | Graff | G06F 16/957 715/234 |
| 2014/0172946 A1* | 6/2014 | Hershberg | H04L 67/2814 709/202 |
| 2014/0258161 A1* | 9/2014 | Brown | G06Q 10/1053 705/321 |
| 2015/0088980 A1* | 3/2015 | Lakes | H04L 67/02 709/203 |
| 2015/0193396 A1* | 7/2015 | Schneckloth | G06F 40/14 715/229 |
| 2015/0293998 A1* | 10/2015 | Clark | G06F 16/9577 707/723 |
| 2015/0347358 A1* | 12/2015 | Shultz | G06F 3/04817 715/234 |
| 2016/0171567 A1* | 6/2016 | Cohen | G07C 13/00 705/12 |
| 2017/0017380 A1* | 1/2017 | Mehrotra | H04W 4/18 |

\* cited by examiner

AUTOMATICALLY REDIRECTING MOBILE CLIENT DEVICES TO OPTIMIZED MOBILE CONTENT

CROSS-REFERENCE TO RELATED APPLICATIONS

This application claims the benefit of U.S. Provisional Application No. 62/681,940, filed Jun. 7, 2018, which is hereby incorporated by reference.

FIELD

Embodiments of the invention relate to the field of network communications; and more specifically, to automatically redirecting mobile client devices to optimized mobile content.

BACKGROUND

An AMP page is an HTML page that has certain restrictions and features in an attempt to speed up regular page loading. AMP pages must obey a set of validation rules (with a limited set of allowed tags, capabilities, and extensions) in order to be rendered quickly and smoothly in the browser and do not degrade user experience. A primary goal of AMP is to improve the performance and experience on mobile devices.

Publishers who provide AMP content often serve two versions of a document: the canonical version, and the AMP version. The canonical version is typically appropriate for desktop clients, and the AMP version is typically appropriate for mobile clients. The canonical version links to the AMP version via a link tag in the HTML. For example, the following links to an AMP version:

<link rel="amphtml" href="https://amp.example.com/articles/123">.

Likewise, the AMP version can link back to the canonical version, such as:

<link rel="canonical" href="https://www.example.com/articles/123">.

Serving the canonical version instead of the AMP version to mobile devices is expensive and slow. It consumes more bandwidth and can cause slow loading for relatively slower cellular connections (e.g., 3G). Instead, the AMP version typically consumes less bandwidth and loads much faster than the canonical version.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
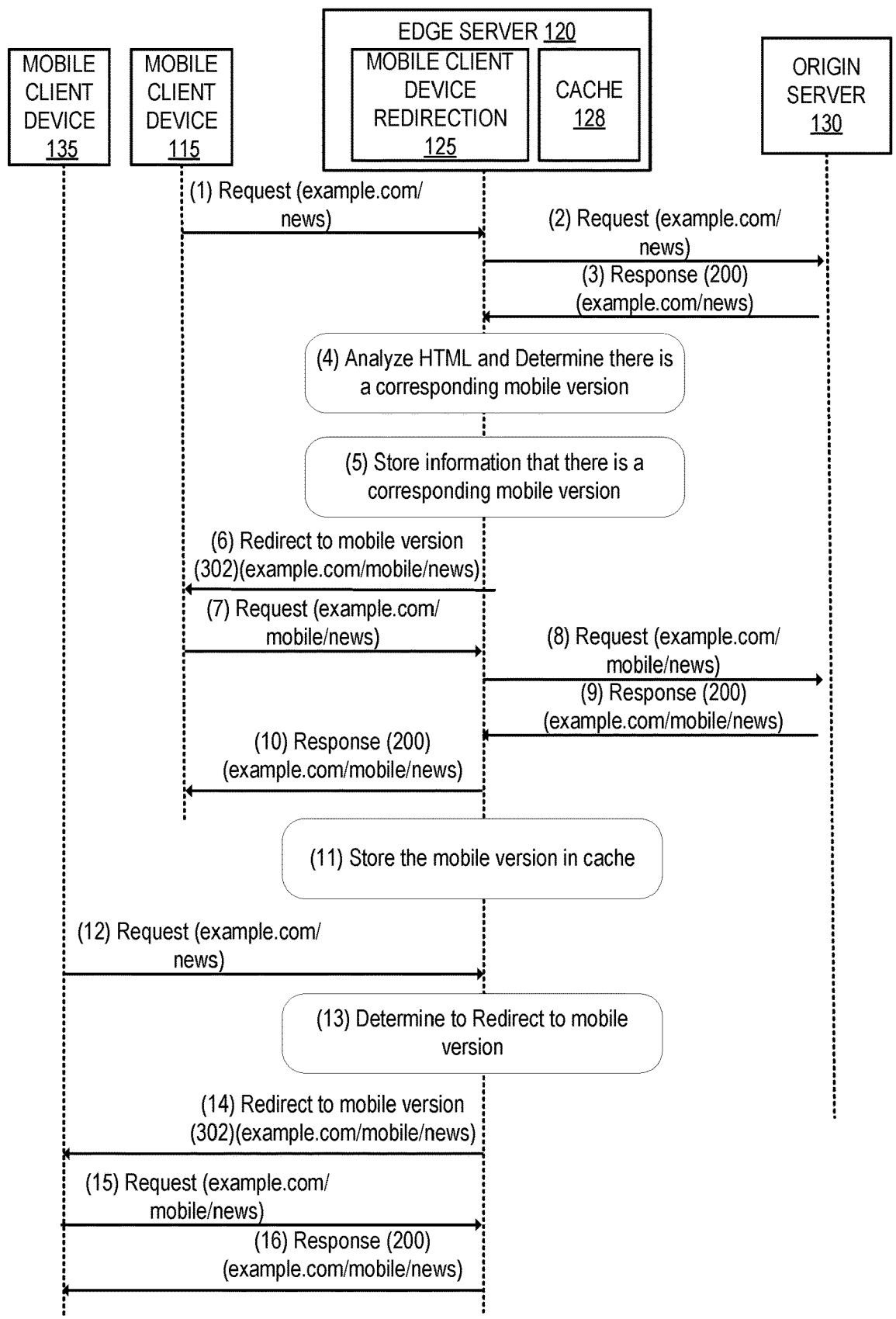
FIG. 1 is a sequence diagram that shows exemplary operations for automatically redirecting mobile client devices to optimized mobile content, according to an embodiment.

A method and apparatus for automatically redirecting mobile client devices to optimized mobile content is described. A request for a document is received from a client device on an edge server. The document may be, for example, an HTML page or other type of web document. The edge server obtains the requested document. For instance, the edge server may transmit a request for the document to the origin server for the document and receive the document from the origin server in response. The edge server analyzes the document and determines that there is a corresponding optimized mobile version of the document. The edge server determines that the request is coming from a mobile device. Instead of transmitting the requested document in its canonical form, the edge server automatically redirects the mobile device to the optimized mobile version of the document (e.g., via an HTTP response status code 302). The edge server receives the request from the mobile device for the optimized mobile version of the document and obtains the optimized mobile version of the document (if not in cache) and transmits the optimized mobile version of the document to the mobile device.

In an embodiment, the publisher configures a URL pattern that is used by the edge server when determining whether there might be a corresponding optimized mobile version. This pattern is sometimes referred herein as the mobile redirect URL pattern. As an example, a mobile redirect URL pattern may be configured as <*.example.com/articles/*>, where a request URL of <https://example.com/articles/article-1> would match the pattern and a request URL of <https://example.com/help/help.html> would not match the pattern. A request URL that matches the mobile redirect URL pattern indicates that there may be a corresponding optimized mobile version of the document. In an embodiment, the publisher also configures a mapping between canonical-URLs and corresponding optimized mobile-URLs. As an example, the mapping may be configured as <*example.com/articles/*>→<*.example.com/mobile/articles/*>, where a canonical document located at <https://example.com/articles/article-1> may have a corresponding optimized mobile version located at <https://example.com/mobile/articles/article-1>.

In another embodiment, the edge server analyzes each document and determines whether there is a corresponding optimized mobile version, and caches information whether there is a corresponding optimized mobile version.

The optimized mobile version of the document may conform to certain restrictions and features to speed up regular page loading. For instance, it may be required to obey a set of validation rules (with a limited set of allowed tags, capabilities, and extensions) to be rendered quickly and smoothly in the browser, and without degrading user experience. Not all mobile versions of web pages are optimized mobile versions. For instance, there may be a mobile version of a web page that does not obey the set of validation rules and therefore is not considered to be an optimized mobile version. An example of an optimized mobile version is an AMP page. An AMP page is an HTML page with a limited set of allowed technical functionality that is defined and governed by an AMP specification. A valid AMP page passes a set of validations that proves conformance to the rules. Validated AMP pages may be processed differently than other types of assets. For instance, certain third-party services including search engines may treat validated AMP pages differently from unvalidated pages.

FIG. 1 is a sequence diagram that shows exemplary operations for automatically redirecting mobile client devices to optimized mobile content, according to an embodiment. FIG. 1 includes the mobile client devices 115 and 135, the edge server 120, and the origin server 130. The mobile client devices 115 and 135 are computing devices that run a mobile client network application such as a mobile browser. The mobile client network application may be identified through its user agent, for example. The mobile client devices 115 and 135 may be a smartphone, tablet, or other computing device that runs a mobile client network application.

The origin server 130 is a computing device on which a network resource resides and/or originates for a domain (e.g., web pages, images, word processing documents, PDF files, movie files, music files, or other computer files). In the example shown in FIG. 1, the origin server 130 is an origin server for the domain "example.com."

The edge server 120 is a computing device that is situated between client devices and the origin server 130. The edge server 120 includes the functionality of a web server and includes the cache 128. In an embodiment, the edge server 120 operates as a reverse proxy server. Certain network traffic may be received and processed through the edge server 120. For instance, the edge server processes web traffic (e.g., HTTP requests/responses, HTTPS requests/responses, SPDY requests/responses, HTTP/2 requests, responses, etc.). The edge server 120 may process web traffic for domains handled by the origin server 130. The cache 128 may cache network resources (e.g., web pages), configuration information, redirection information, or other data. The edge server 120 includes the mobile client device redirection module 125 that automatically redirects mobile client devices to optimized mobile content as will be described herein.

The edge server 120 may be one server of multiple servers or nodes that each may include one or more edge servers, one or more control servers, one or more DNS servers (e.g., one or more authoritative name servers), and one or more other pieces of networking equipment (e.g., one or more routers, switches, hubs, etc.). Each edge server 120 may be part of a data center or a collocation site. In an embodiment, the multiple edge servers are geographically distributed. For example, in some embodiments, the service uses multiple edge nodes that are geographically distributed to decrease the distance between requesting client devices and content. In an embodiment, the edge server 120 receives traffic from client devices because a DNS request for the domain returns an IP address of the edge server 120 instead of the origin server 130. The multiple edge servers may have the same anycast IP address. As a result, when a request is made, the edge server that is closest to the client device in terms of routing protocol configuration (e.g., Border Gateway Protocol (BGP) configuration) according to an anycast implementation as determined by the network infrastructure (e.g., router(s), switch(es), and/or other network equipment between the client and the edge servers). In some embodiments, instead of using an anycast mechanism, embodiments use a geographical load balancer to route traffic to the nearest edge server.

At operation 1, the edge server 120 receives a request for an action to performed on an identified resource (e.g., an HTTP GET request) of the origin server 130. The request may be for a document such as a web page. The request is received from the mobile client device 115. In the example shown in FIG. 1, the request is for a web page located at "example.com/news". The web page that is requested is not optimized for mobile devices. The request may be received by the edge server 120 because of a Domain Name System (DNS) request for the domain of the requested resource returning an IP address of the edge server 120 instead of an IP address of the origin server 130. For example, if the origin server 130 handles the domain "example.com", a DNS request for "example.com" returns an IP address of the edge server 120 instead of an IP address of the origin server 130. In some embodiments, multiple domains that may be owned by different domain owners may resolve to the edge server 120 (e.g., resolve to the same IP address or a different IP address of the edge server 120). In an embodiment, the edge server 120 is one of multiple edge servers that are geographically distributed and are anycasted to the same IP address or the same set of IP address. The edge server 120 may receive the request because it is the closest server to the requesting mobile client device 115 in terms of routing protocol configuration (e.g., Border Gateway Protocol (BGP) configuration) according to an Anycast implementation as determined by the network infrastructure (e.g., the routers, switches, or other network equipment between the mobile client device 115 and the edge server 120) that is not illustrated in FIG. 1 for simplicity purposes.

The edge server 120 processes the received request and retrieves the requested web page. The edge server 120 retrieves the requested resource from the cache 128 if it is available and/or not expired. If the requested resource is not available in the cache 128 or it has expired, the edge server 120 retrieves the requested resource from the appropriate origin server. For example, the edge server 120 may transmit a request for the web page and receive a response having the requested web page from the origin server 130. In the example shown in FIG. 1, at the time of processing the request in operation 1, the requested web page located at "example.com/news" is not available in cache 128 so the edge server 120 transmits a request for the requested page (e.g., an HTTP GET request) to the origin server 130 at operation 2. At operation 3, the edge server 120 receives a response from the origin server 130 that includes the requested resource. In this case, the web page located at "example.com/news". The response includes an HTTP status code 200, for example. The web page may be cached in the cache 128.

Since the request is received from a mobile client device (as opposed to a client device that is not identified as a mobile device), the edge server 120 determines whether the requested resource is optimized for mobile devices and if not, whether there is a corresponding version of the requested resource that is optimized for mobile devices.

In an embodiment, the edge server 120 analyzes the HTML of the of the retrieved web page to determine whether the web page is optimized for mobile devices and if not, whether there is a corresponding version of the web page that is optimized for mobile devices. The edge server 120 can determine if the retrieved web page is optimized for mobile devices by analyzing the HTML. In some cases, the edge server 120 analyzes the HTML to look for a signature that identifies the page as being optimized for mobile devices. For instance, in the case of AMP HTML, the HTML must include a tag that identifies it as being an AMP HTML page, which can be identified by the edge server 120. Alternatively, or additionally, the edge server 120 may analyze the structure of the HTML to determine whether the page is optimized for mobile devices, and if there is corresponding version of the page that is optimized for mobile devices. For instance, the edge server 120 may analyze the HTML (e.g., the head portion of the HTML) to determine whether it contains a link tag that points to a canonical version of the document (e.g., not optimized for mobile devices), a link tag that points to an optimized mobile version of the document, or a link tag that points to itself if no such canonical version of the document exists.

In another embodiment, the edge server 120 analyzes the URL of the requested resource to determine whether the requested web page is optimized for mobile devices. For instance, the cache 128 may include information that indicates whether the URL of the requested resource is for a canonical version of the web page, an optimized mobile version of the web page, and/or is for a canonical version of the web page but there is a corresponding optimized mobile version of the web page located at a different URL (the different URL may be specified).

In the example shown in FIG. 1, at operation 4 the edge server 120 analyzes the HTML of the web page received in operation 3 and determines that the web page is not optimized for mobile devices and there is a corresponding optimized mobile version of the web page. For instance, the edge server 120 locates a link tag in the HTML of the web page that points to an optimized mobile version of the web page. In the example shown in FIG. 1, the optimized mobile version of the web page is located at "example.com/mobile/news."

At operation 5, which is optional in an embodiment, the edge server 120 causes information to be stored (e.g., in the cache 128) that for the requested network resource there is a corresponding optimized mobile version. The stored information may associate the requested network resource (the canonical version) with the optimized mobile version.

At operation 6, the edge server 120 transmits a response to the mobile client device 115 that includes a redirect message to the optimized mobile version of the web page. For instance, the response may include an HTTP response status code 302 that provides the URL of the optimized mobile version of the page. As shown in FIG. 1, the 302 response includes the URL of the optimized mobile version of the web page "example.com/mobile/news."

The redirect message causes the mobile client device 115 to make another request for the web page at the URL identified in the redirect message. Thus, at operation 7, the edge server 120 receives a request for the web page located at "example.com/mobile/news." If the requested web page is not available in the cache 128, the edge server 120 transmits a request to the origin server 130 for the optimized mobile version of the web page. In the example shown in FIG. 1, the requested web page is not available in the cache 128. Thus, at operation 8, the edge server 120 transmits a request to the origin server 130 for the optimized mobile version of the web page located at "example.com/mobile/news."

At operation 9, the edge server 120 receives a response from the origin server 130 that includes the requested web page. After receiving the response from the origin server 130, the edge server 120 may validate the page according to the set of rules. Next, at operation 10, the edge server 120 transmits the response with the optimized mobile version of the web page to the mobile client device 115. Optionally, the edge server 120 stores the optimized mobile version of the web page in the cache 128 at operation 11.

Although FIG. 1 shows the edge server 120 waiting to receive the request in operation 7 before transmitting a request for the optimized mobile version of the web page in operation 8, the edge server 120 may transmit a request for the optimized mobile version of the web page before, or substantially concurrently, with transmitting the redirect message of operation 6. In such an embodiment, the edge server 120 may cache the optimized mobile version of the web page in the cache 128 so that it can respond to a request for the optimized mobile version of the web page without waiting to receive the optimized mobile version of the web page from the origin server. The same physical origin server 130 may handle both the canonical version and the optimized mobile version of the web page, or different origin servers 130 may handle the canonical version and the optimized mobile version of the web page. Instead of being handled by the origin server 130, the optimized mobile version of the web page may be retrieved from a caching server.

As shown in operations 1-10, the edge server 120 automatically redirects a mobile client device to an optimized mobile version of the document responsive to determining the following: the client device is a mobile client device, the original request is for the canonical version of the document, and there is an optimized mobile version of the document available. This automatic redirection may be performed without the publisher of the document installing any new hardware or rewriting their code.

Sometime later, at operation 12, the edge server 120 receives a request for a web page from the mobile client device 135. The request received in operation 12 is like the request received in operation 1. As shown in FIG. 1, the request is for the web page located at "example.com/news."

Next, at operation 13, the edge server 120 determines to redirect the requesting client device to the optimized mobile version of the web page. In an embodiment, the edge server 120 determines to redirect the requesting client device to the optimized mobile version of the web page in response to determining that the request is being received from a mobile client device (as opposed to a client device that is not identified as a mobile device), the request is for the canonical version of the web page, and there is an optimized mobile version of the document available. The edge server 120 may determine that the request is received from a mobile client device by examining the user-agent in the header of the request to determine whether the user-agent is a known mobile user-agent. If the user-agent matches a known mobile user-agent, the edge server 120 determines that the request is from a mobile client device. The edge server 120 may determine that the request is for the canonical version of the web page (not the optimized mobile version of the page) and there is an optimized mobile version of the web page available by accessing the information in the cache 128 that was stored in operation 5.

At operation 14, the edge server 120 transmits a response to the mobile client device 135 that includes a redirect message to the optimized mobile version of the web page. The response in operation 14 is like the response transmitted in operation 6. The redirect message causes the mobile client device 135 to make another request for the web page at the URL identified in the redirect message. Thus, at operation 15, the edge server 120 receives a request for the web page located at "example.com/mobile/news." If the requested web page is not available in the cache 128, the edge server 120 transmits a request to the origin server 130 for the optimized mobile version of the web page. In the example shown in FIG. 1, the requested web page is available in the cache 128. Thus, at operation 16, the edge server 120 transmits the response with the optimized mobile version of the web page to the mobile client device 135.

Although not shown in FIG. 1, if a non-mobile client device makes a request like the request in operation 1, the edge server 120 does not redirect that client device to the optimized mobile version.

As shown in FIG. 1, mobile client devices can be automatically directed to optimized mobile versions of the web page instead of being served a non-optimized version of that web page. This saves bandwidth (optimized mobile versions of the web page are typically smaller in size than the non-optimized counterpart) and loads much faster than content from canonical URLs. Also, the automatic redirection can be performed with minimal input from the publisher. For instance, publishers are not required to install any new hardware or rewrite their code.

Figure 2:
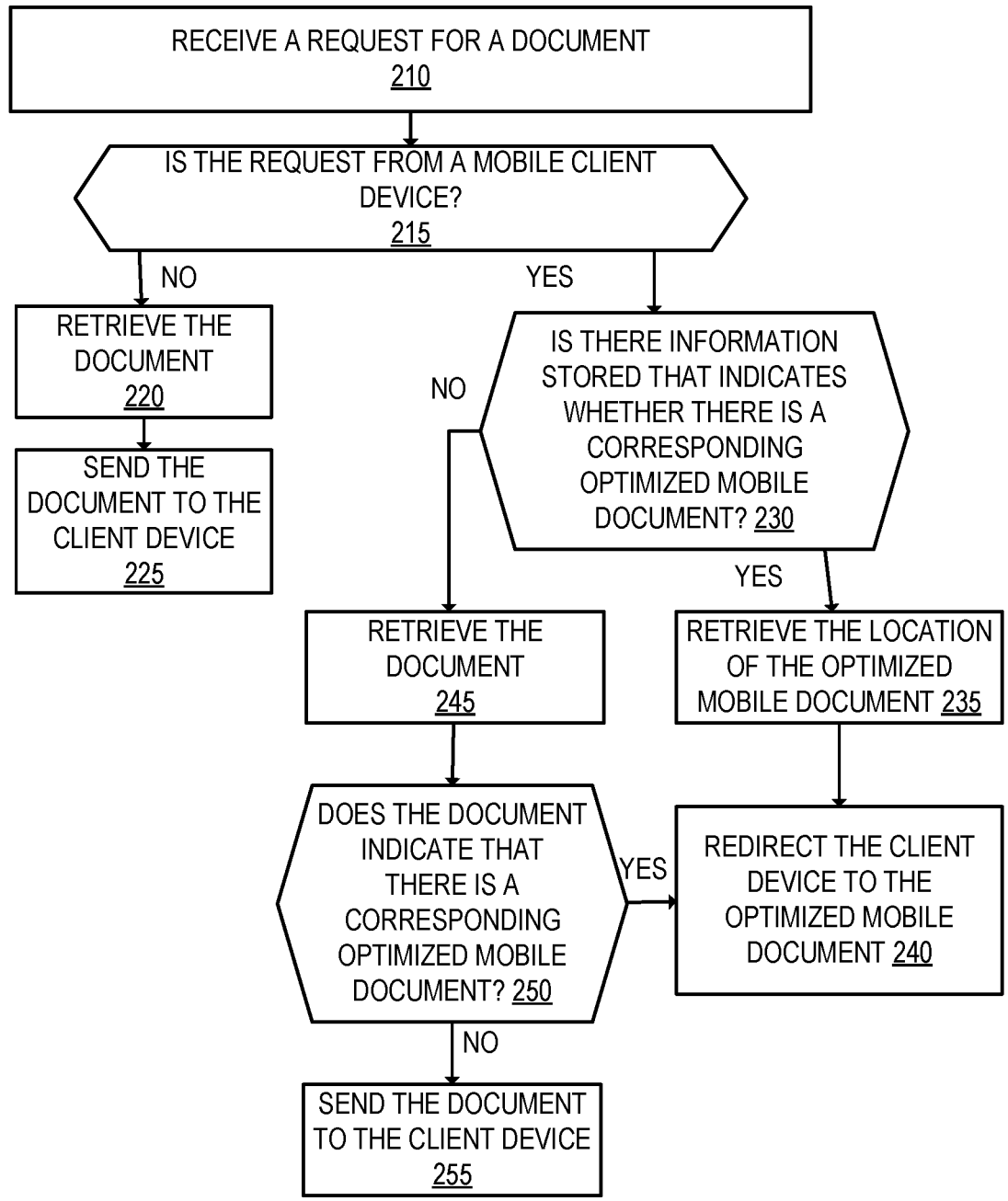
FIG. 2 is a flow diagram that shows exemplary operations for automatically redirecting mobile client devices to optimized mobile content, according to an embodiment.

FIG. 2 is a flow diagram that shows exemplary operations for automatically redirecting mobile client devices to optimized mobile content, according to an embodiment. The operations of FIG. 2 will be described with respect to the exemplary embodiment of FIG. 1. However, the operations of FIG. 2 can be performed by different embodiments than those of FIG. 1, and the embodiment described in FIG. 1 can perform operations different than those of FIG. 2.

At operation 210, the edge server 120 receives a request for a document of the origin server 130 from a client device. The request may be an HTTP GET request, for example. The request may be received by the edge server 120 instead of the origin server 130 because a DNS request for the domain of the document returns an IP address of the edge server 120 instead of the origin server 130.

Next, at operation 215, the edge server 120 determines whether the request is from a client device that is a mobile client device. This determination may be made by examining the user-agent in the header of the request. For instance, the edge server 120 may store information that identifies known mobile user-agents. If the user-agent as identified in the request header matches a known mobile user-agent, the edge server 120 determines that the request is from a mobile client device. If the user-agent as identified in the request header does not match a known mobile user-agent, then the edge server 120 determines that the request is not from a mobile client device.

If the request is not from a mobile client device, then at operation 220 the edge server 120 retrieves the document. If the requested document is available in the cache 128, the edge server 120 may retrieve the document from the cache 128. If the requested resource is not available in the cache 128 or it has expired, the edge server 120 retrieves the document from the appropriate origin server. For example, the edge server 120 may transmit a request for the document to its origin server and receive a response with the requested document. The edge server 120 may cache the document in the cache 128. Next, at operation 225, the edge server 120 sends the document to the client device.

If the request is from a mobile client device, then at operation 230 the edge server 120 determines whether there is stored information that indicates that there is a corresponding optimized mobile version of the requested document. That is, whether there is information stored that indicates that the requested URL is for a canonical version of the document and there is a corresponding optimized mobile version of the document located at a different URL. For instance, the edge server 120 accesses the cache 128 to determine whether there is information that indicates whether there is a corresponding optimized mobile version of the document. The cache may indicate whether the requested URL corresponds to a canonical version of the document, corresponds to an optimized mobile version of the document, and/or corresponds to a canonical version of the document but there is a corresponding optimized mobile version of the document located at a different URL (the different URL may be specified). If the cache does not include information indicating that there is a corresponding optimized mobile version of the document, then control moves to operation 245. If there is information stored that indicates that there is a corresponding optimized mobile version of the requested document, then control moves to operation 235.

At operation 235, the edge server 120 retrieves the location of the optimized mobile version of the requested document. For example, the information in the cache may store the location of the optimized mobile version of the requested document. Next, at operation 240, the edge server 120 transmits a response to the client device that includes a redirect message to the optimized mobile version of the web page. For instance, the response may include an HTTP response status code 302 that provides the URL of the optimized mobile version of the page.

At operation 245 (the cache does not include information indicating that there is a corresponding optimized mobile version of the document), the edge server 120 retrieves the requested document. If the requested document is available in the cache 128, the edge server 120 may retrieve the document from the cache 128. If the requested resource is not available in the cache 128 or it has expired, the edge server 120 retrieves the document from the appropriate origin server. For example, the edge server 120 may transmit a request for the document to its origin server and receive a response with the requested document. The edge server 120 may cache the document in the cache 128.

Next, at operation 250, the edge server 120 determines whether the retrieved document indicates that there is a corresponding optimized mobile document. For instance, the edge server 120 may analyze the HTML of the retrieved document to determine whether the retrieved document is optimized for mobile devices, and if not, whether there is a corresponding version of the document that is optimized for mobile devices. In some cases, the edge server 120 analyzes the HTML to look for a signature that identifies the page as being optimized for mobile devices. For instance, in the case of AMP HTML, the HTML must include a tag that identifies it as being an AMP HTML page, which can be identified by the edge server 120. Alternatively, or additionally, the edge server 120 may analyze the structure of the HTML to determine whether the page is optimized for mobile devices, and if there is corresponding version of the page that is optimized for mobile devices. For instance, the edge server 120 may analyze the HTML (e.g., the head portion of the HTML) to determine whether it contains a link tag that points to a canonical version of the document (e.g., not optimized for mobile devices), a link tag that points to an optimized mobile version of the document, or a link tag that points to itself if no such canonical version of the document exists.

If the document indicates that there is a corresponding optimized mobile version (meaning that the document is a canonical version and includes a reference to an optimized mobile version of the document), then flow moves to operation 240 where the edge server 120 transmits a response to the client device that includes a redirect message to the optimized mobile version of the web page referenced in the document. The URL of the optimized mobile version of the web page may be found in the document. For instance, in the case of AMP HTML, the document may include a tag that specifies the location of the corresponding optimized mobile version. The edge server 120 may cache the information indicating whether there is a corresponding optimized mobile version of the document, including the URL of such a corresponding optimized mobile version.

If the document does not indicate that there is a corresponding optimized mobile version, then flow moves to operation 255 where the edge server 120 sends the document to the client device. If the document indicates that it is a corresponding optimized mobile version, optionally the edge server 120 caches that information for the document and/or the URL of the canonical version of the document.

Figure 3:
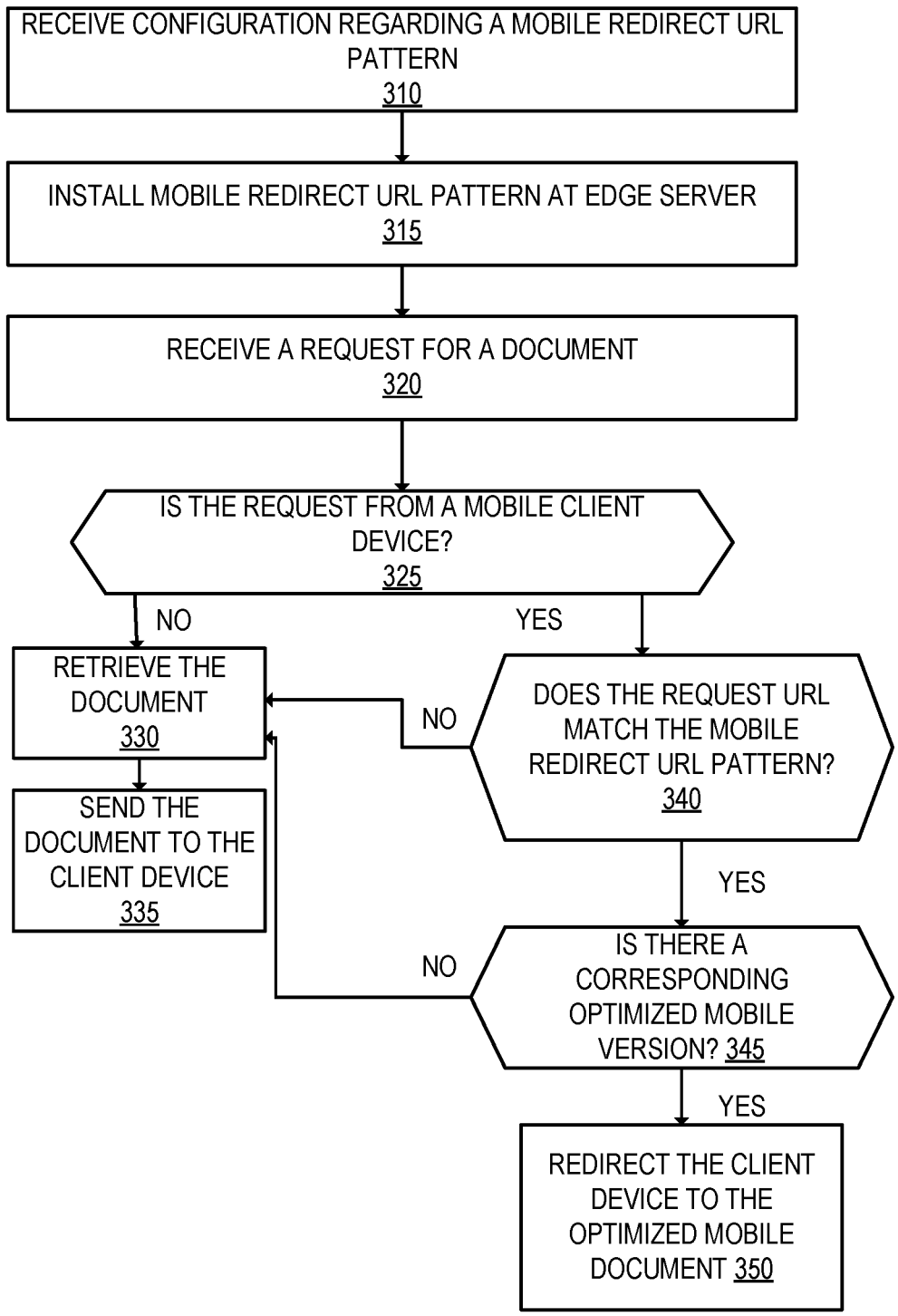
FIG. 3 is a flow diagram that shows exemplary operations for automatically redirecting mobile client devices to optimized mobile content, according to an embodiment.

FIG. 3 is a flow diagram that shows exemplary operations for automatically redirecting mobile client devices to optimized mobile content, according to an embodiment. The operations of FIG. 3 will be described with respect to the exemplary embodiment of FIG. 1. However, the operations of FIG. 3 can be performed by different embodiments than those of FIG. 1, and the embodiment described in FIG. 1 can perform operations different than those of FIG. 3.

At operation 310, configuration information regarding a mobile redirect URL pattern is received from a publisher, for example. The mobile redirect URL pattern is to be used by the edge server when determining whether there might be a corresponding optimized mobile version. In an embodiment, the configuration also includes a mapping between canonical-URLs and corresponding optimized mobile-URLs that is used by the edge server to determine a likely URL for a corresponding optimized mobile version of a document. The configuration information may be received by a configuration server that provides an interface for the publisher to enter the configuration information. The configuration server may distribute the configured mobile URL pattern to the edge server 120. Thus, at operation 315, the mobile redirect URL pattern is installed at the edge server 120.

Next, at operation 320, the edge server 120 receives a request for a document of the origin server 130 from a client device. The request may be an HTTP GET request, for example. The request may be received by the edge server 120 instead of the origin server 130 because a DNS request for the domain of the document returns an IP address of the edge server 120 instead of the origin server 130.

Next, at operation 325, the edge server 120 determines whether the request is from a client device that is a mobile client device. This determination may be made by examining the user-agent in the header of the request. For instance, the edge server 120 may store information that identifies known mobile user-agents. If the user-agent as identified in the request header matches a known mobile user-agent, the edge server 120 determines that the request is from a mobile client device. If the user-agent as identified in the request header does not match a known mobile user-agent, then the edge server 120 determines that the request is not from a mobile client device.

If the request is not from a mobile client device, then at operation 330 the edge server 120 retrieves the document. If the requested document is available in the cache 128, the edge server 120 may retrieve the document from the cache 128. If the requested resource is not available in the cache 128 or it has expired, the edge server 120 retrieves the document from the appropriate origin server. For example, the edge server 120 may transmit a request for the document to its origin server and receive a response with the requested document. The edge server 120 may cache the document in the cache 128. Next, at operation 335, the edge server 120 sends the document to the client device.

If the request is from a mobile client device, then at operation 340 the edge server 120 determines whether the URL identified with the request (the request URL) matches the configured mobile redirect URL pattern. By way of example, if the configured mobile redirect URL pattern is <*.example.com/articles/*>, a request URL of <http://example.com/articles/article-1> matches the configured mobile redirect URL pattern and a request URL of <https://example.com/help/help.html> would not match the pattern. If the request URL matches the mobile redirect URL pattern, then flow moves to operation 345. If the request URL does not match the mobile redirect URL pattern, then flow moves to operation 330.

In some cases, even though a request URL matches a mobile redirect URL pattern, there may not be a corresponding optimized mobile version of the requested document. At operation 345, the edge server 120 determines whether there is a corresponding optimized mobile version of the requested document. In an embodiment, the edge server 120 makes this determination by retrieving the canonical version of the document and analyzing the content of the document to determine if there is a link or reference to a corresponding optimized mobile version of the requested document. For instance, if the document is an HTML document, the edge server 120 may look for a tag in the document points to a corresponding optimized mobile version of the document. In an embodiment, if the edge server 120 includes a mapping between canonical-URLs and corresponding optimized mobile-URLs, the edge server 120 determines a likely URL for a corresponding optimized mobile version and checks whether a document exists at that location (e.g., transmitting a request for the document at that location and analyzing the response to determine if there is a corresponding optimized mobile version). The edge server 120 may cache the corresponding optimized mobile version of the requested document and/or the redirect decision.

If there is not a corresponding optimized mobile version of the requested document, then flow moves to operation 330 where the document is retrieved (unless it has already been retrieved). If, however, there is a corresponding optimized mobile version of the requested document, then flow moves to operation 350 where the edge server 120 transmits a response to the client device that includes a redirect message to the optimized mobile version of the web page referenced in the document.

Although embodiments have describe automatically redirecting mobile client devices (e.g., using an HTTP response status code 302), in an embodiment the edge server 120 pushes the optimized mobile version to the mobile client device, such as by using HTTP/2 server push. For instance, the edge server 120 may transmit a push promise message for the optimized mobile version of the document and push the optimized mobile version of the document to the mobile client device. For instance, in operation 6 of FIG. 1, the edge server 120 may push the optimized mobile version to the mobile client device 115 instead of or in addition to transmitting a redirect message to the mobile client device 115. In this way, instead of the mobile client device 115 issuing the request shown in operation 7 of FIG. 1, the mobile client device 115 may receive the optimized mobile version of the document faster. Similarly, in FIG. 2, instead of or in addition to redirecting the client device to the optimized mobile document in operation 240, the edge server 120 may push the optimized mobile document to the mobile client device. Similarly, in FIG. 3, instead of or in addition to redirecting the client device to the optimized mobile document in operation 350, the edge server 120 may push the optimized mobile document to the mobile client device.

As described herein, embodiments allow for mobile client devices to be automatically directed to optimized mobile versions of the web page instead of being served a non-optimized version of that web page. This saves bandwidth (optimized mobile versions of the web page are typically smaller in size than the non-optimized counterpart) and loads much faster than content from canonical URLs. Also, the automatic redirection can be performed with minimal input from the publisher. For instance, publishers are not required to install any new hardware or rewrite their code.

Figure 4:
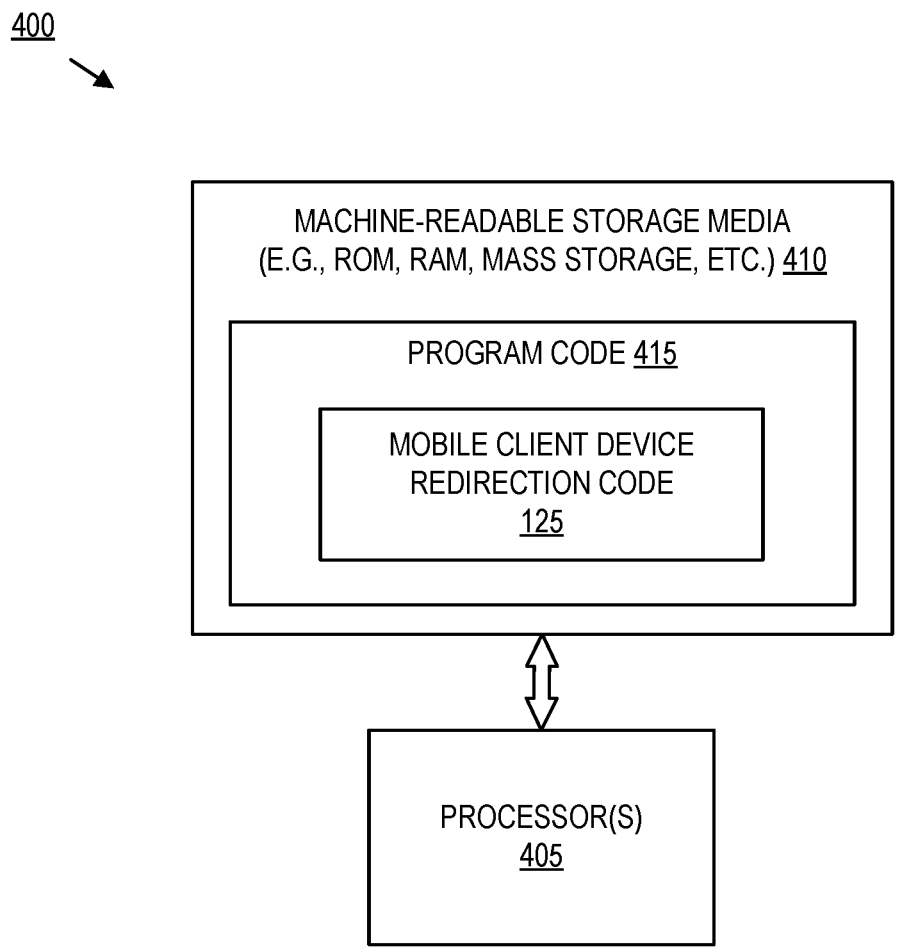
FIG. 4 is a block diagram that shows an exemplary data processing system that may be used in some embodiments.

FIG. 4 is a block diagram that shows an exemplary data processing system that may be used in some embodiments. Data processing system 400 includes one or more processors 405 and connected system components (e.g., multiple connected chips). Alternatively, the data processing system 400 is a system on a chip or Field-Programmable gate array. One or more such data processing systems 400 may be utilized to implement the embodiments and operations described with reference to FIGS. 1-3.

The data processing system 400 is an electronic device that stores and transmits (internally and/or with other electronic devices over a network) code (which is composed of software instructions and which is sometimes referred to as computer program code or a computer program) and/or data using machine-readable media (also called computer-readable media), such as non-transitory machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 405. For example, the depicted non-transitory machine-readable storage media 410 may store program code 415 that, when executed by the processor(s) 405, causes the data processing system 400 to perform the automatic redirecting of mobile client devices to optimized mobile content described herein. For example, the program code 415 may include the mobile client device redirection module 125 that, when executed by the processor(s) 405, cause the data processing system 400 to perform at least some of the operations of FIGS. 2-3.

The data processing system 400 also includes a set or one or more physical network interface(s) to establish network connections (to transmit and/or receive code and/or data using propagating signals) with other electronic devices. It will be appreciated that one or more buses may be used to interconnect the various components shown in FIG. 4. One or more parts of an embodiment of the invention may be implemented using different combinations of software, firmware, and/or hardware. In an embodiment, the edge server 120 may take the form of the data processing system 400.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a server, comprising:
receiving, from a first client device, a first request for a first document;
determining, from the first request, that the first client device is a mobile client device;
determining that the first request includes a URL matching a mobile redirect URL pattern;
retrieving a canonical version of the first document;
analyzing the canonical version of the first document to determine whether the canonical version of the first document requested in the first request is an optimized mobile version that obeys a set of validation rules or is a non-optimized mobile version;
determining that the canonical version of the first document requested in the first request is a non-optimized mobile version, and responsive to this determination, determining that there is an optimized mobile version of the first document that is located at a different location from a location of the requested first document based on analyzing structure of HTML of the canonical version of the first document requested and identifying an HTML link tag that points to the optimized mobile version of the first document;
instead of transmitting the first document requested in the first request to the first client device, transmitting a redirect message to the first client device to the optimized mobile version of the first document that is located at the different location using the identified HTML link tag that points to the optimized mobile version of the first document;
receiving, from the first client device, a second request for the optimized mobile version of the first document that is located at the different location;
retrieving the optimized mobile version of the first document; and
transmitting, to the first client device, the optimized mobile version of the first document.

2. The method of claim 1, wherein determining that the first client device is the mobile client device includes examining a user-agent in a header of the first request.

3. The method of claim 1, wherein determining that there is an optimized mobile version of the first document that is located at the different location includes accessing information stored on the server that indicates that the optimized mobile version of the first document is located at the different location.

4. The method of claim 1, wherein determining that there is an optimized mobile version of the first document includes:
retrieving the first document requested in the first request; and
analyzing the first document and locating the HTML link tag that points to the optimized mobile version of the first document.

5. The method of claim 1, further comprising:
receiving, from a second client device, a third request for a second document;
determining, from the third request, that the second client device is not a mobile client device; and
responsive to determining that the second client device is not a mobile client device, performing the following:
retrieving the second document, and
transmitting, to the second client device, the second document.

6. A non-transitory machine-readable storage medium that provides instructions that, if executed by a processor of a server, will cause said processor to perform operations comprising:
receiving, from a first client device, a first request for a first document;
determining, from the first request, that the first client device is a mobile client device;
determining that the first request includes a URL matching a mobile redirect URL pattern;
retrieving a canonical version of the first document;
analyzing the canonical version of the first document to determine whether the canonical version of the first document requested in the first request is an optimized mobile version that obeys a set of validation rules or is a non-optimized mobile version;
determining that the canonical version of the first document requested in the first request is a non-optimized mobile version, and responsive to this determination, determining that there is an optimized mobile version of the first document that is located at a different location from a location of the requested first document based on analyzing structure of HTML of the canonical version of the first document requested and identifying an HTML link tag that points to the optimized mobile version of the first document;
instead of transmitting the first document requested in the first request to the first client device, transmitting a redirect message to the first client device to the optimized mobile version of the first document that is located at the different location using the identified HTML link tag that points to the optimized mobile version of the first document;
receiving, from the first client device, a second request for the optimized mobile version of the first document that is located at the different location;
retrieving the optimized mobile version of the first document; and
transmitting, to the first client device, the optimized mobile version of the first document.

7. The non-transitory machine-readable storage medium of claim 6, wherein determining that the first client device is the mobile client device includes examining a user-agent in a header of the first request.

8. The non-transitory machine-readable storage medium of claim 6, wherein determining that there is an optimized mobile version of the first document that is located at the different location includes accessing information stored on the server that indicates that the optimized mobile version of the first document is located at the different location.

9. The non-transitory machine-readable storage medium of claim 6, wherein determining that there is an optimized mobile version of the first document includes:
retrieving the first document requested in the first request; and
analyzing the first document and locating the HTML link tag that points to the optimized mobile version of the first document.

10. The non-transitory machine-readable storage medium of claim 6, wherein the operations further comprise:
receiving, from a second client device, a third request for a second document;
determining, from the third request, that the second client device is not a mobile client device; and
responsive to determining that the second client device is not a mobile client device, performing the following:
retrieving the second document, and
transmitting, to the second client device, the second document.

11. A server, comprising:
a processor; and
a non-transitory machine-readable storage medium that provides instructions that, if executed by the processor, causes the server to perform operations including:
receive, from a first client device, a first request for a first document;
determine, from the first request, that the first client device is a mobile client device;
determine that the first request includes a URL matching a mobile redirect URL pattern;
retrieve a canonical version of the first document;
analyze the canonical version of the first document to determine whether the canonical version of the first document requested in the first request is an optimized mobile version that obeys a set of validation rules or is a non-optimized mobile version;
determine that the canonical version of the first document requested in the first request is a non-optimized mobile version, and responsive to this determination, determine that there is an optimized mobile version of the first document that is located at a different location from a location of the requested first document based on analyzing structure of HTML of the canonical version of the first document requested and identifying an HTML link tag that points to the optimized mobile version of the first document;
instead of transmitting the first document requested in the first request to the first client device, transmit a redirect message to the first client device to the optimized mobile version of the first document that is located at the different location using the identified HTML link tag that points to the optimized mobile version of the first document;
receive, from the first client device, a second request for the optimized mobile version of the first document that is located at the different location;
retrieve the optimized mobile version of the first document; and
transmit, to the first client device, the optimized mobile version of the first document.

12. The server of claim 11, wherein the determination that the first client device is the mobile client device includes an examination of a user-agent in a header of the first request.

13. The server of claim 11, wherein the determination that there is an optimized mobile version of the first document that is located at the different location includes the server to access information stored on the server that indicates that the optimized mobile version of the first document is located at the different location.

14. The server of claim 11, wherein the determination that there is an optimized mobile version of the first document includes:

retrieve the first document requested in the first request; and analyze the first document and locate the HTML link tag that points to the optimized mobile version of the first document.

15. The server of claim 11, wherein the operations further include:
receive, from a second client device, a third request for a second document;

determine, from the third request, that the second client device is not a mobile client device; and responsive to the determination that the second client device is not a mobile client device, perform the following:
retrieve the second document, and transmit, to the second client device, the second document.

* * * * *